(No Model.)
A. B. CLARK.
CASTER.
No. 440,875. Patented Nov. 18, 1890.
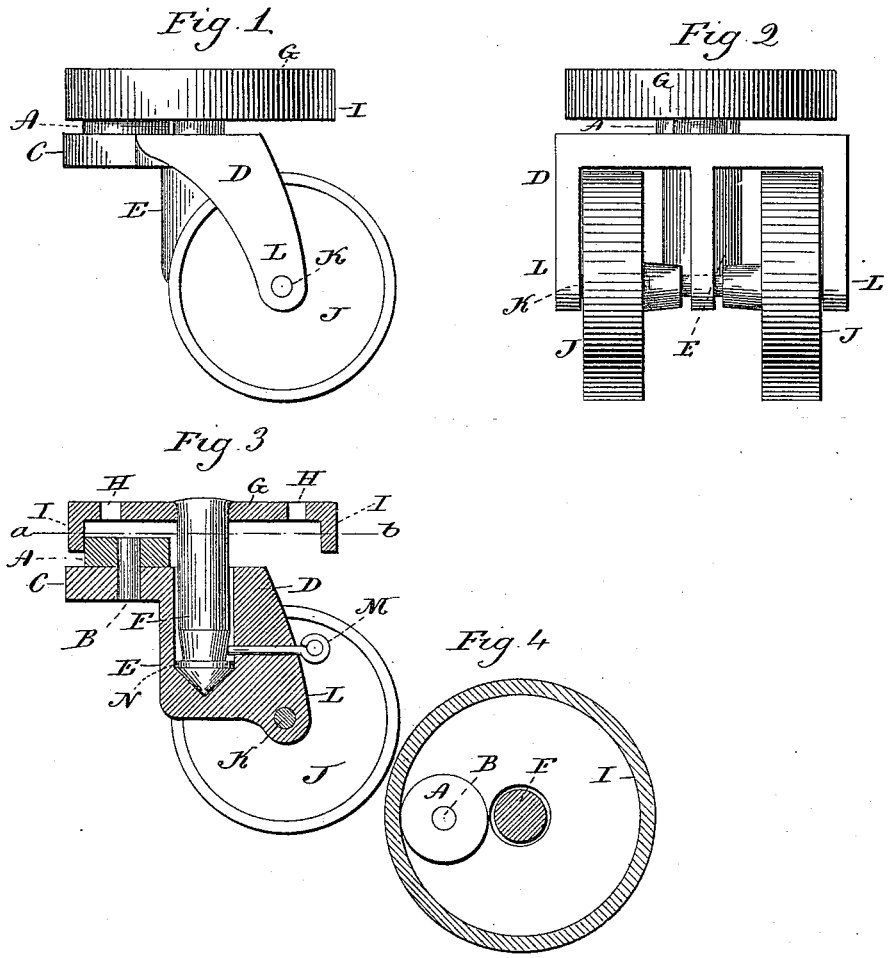

UNITED STATES PATENT OFFICE.

AMBROSE B. CLARK, OF MERIDEN, CONNECTICUT.

CASTER.

SPECIFICATION forming part of Letters Patent No. 440,875, dated November 18, 1890.

Application filed April 4, 1890. Serial No. 346,562. (No model.)

*To all whom it may concern:*

Be it known that I, AMBROSE B. CLARK, of Meriden, in the county of New Haven and State of Connecticut, have invented a new Improvement in Casters; and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of a two-wheeled caster embodying my invention; Fig. 2, a view thereof in front elevation; Fig. 3, a view thereof in vertical central section; Fig. 4, a view thereof in horizontal section on line $a\ b$ of Fig. 3.

As herein shown, the caster has a caster-plate G, provided with screw-holes H to receive screws, by means of which it is rigidly attached to the object to which the caster is applied, with a rigid pintle F depending from its center, and with a concentric annular flange I depending from its edge.

The caster-frame D is provided with a depending socket E to receive the said pintle, and with an ear C offsetting from the rear edge of the upper end of the socket, and carrying a pin B, arranged parallel with the pintle, extending above its upper face and forming the axis of an anti-friction roller A, which bears upon the top of the ear and bears against the inner face of the said annular flange. The said frame is adapted in width to receive two caster-wheels J J, which are mounted upon a horizontal axis K, located eccentrically to the said socket and supported between its ends in a bearing or web L offsetting from the forward face thereof. A horizontal longitudinally-movable pin M, entering the lower end of the socket through a small opening formed in the said web, projects into a neck N formed in the pintle and holds the same in place. As thus arranged the anti-friction roller takes the lateral strain upon the pintle and greatly promotes the free action of the caster.

I am aware that a caster having anti-friction rollers mounted on axes parallel with that of the pintle and running upon a stationary part of the caster is not new. I am also aware that a caster having an annular flange and anti-friction rollers arranged to run upon the inner face thereof is not new. I do not, therefore, claim such constructions, broadly; but, Having fully described my invention, what I do claim as new, and desire to secure by Letters Patent, is—

In a caster, the combination of the caster-plate constructed with a depending pintle at its center and with a depending flange around the edge of the plate concentric with said pintle, a caster-frame arranged upon said pintle and so as to revolve thereon in a horizontal plane, a caster-wheel hung in the said frame at one side of the center of said pintle, and a friction-roller mounted on the frame upon the side of the pintle opposite the caster-wheel, the said roller arranged upon an axis substantially parallel to the axis of the pintle and adapted to bear upon the depending flange of the caster-plate at a point substantially opposite the caster-wheel, all substantially as described.

AMBROSE B. CLARK.

Witnesses:
FRED. C. EARLE,
LILLIAN D. KELSEY.